(12) United States Patent
Yoshida et al.

(10) Patent No.: US 8,475,643 B2
(45) Date of Patent: Jul. 2, 2013

(54) ANODIC OXIDATION METHOD AND PRODUCTION FOR TITANIUM OXIDE COATING AND METHOD OF SUPPORTING CATALYST

(75) Inventors: Hideo Yoshida, Tokorozawa (JP); Kentaro Abe, Higashimurayama (JP); Kiyohito Sakon, Higashimurayama (JP)

(73) Assignee: Hideo Yoshida, Saitama (JP)

( * ) Notice: Subject to any disclaimer, the term of this patent is extended or adjusted under 35 U.S.C. 154(b) by 1214 days.

(21) Appl. No.: 10/526,205

(22) PCT Filed: Apr. 27, 2004

(86) PCT No.: PCT/JP2004/006099
§ 371 (c)(1), (2), (4) Date: Mar. 1, 2005

(87) PCT Pub. No.: WO2004/101864
PCT Pub. Date: Nov. 25, 2004

(65) Prior Publication Data
US 2006/0065539 A1    Mar. 30, 2006

(30) Foreign Application Priority Data

May 16, 2003  (JP) ................................. 2003-138234
Nov. 25, 2003  (JP) ................................. 2003-393356

(51) Int. Cl.
  *C25D 11/06*  (2006.01)
  *C25D 11/18*  (2006.01)
  *C25D 11/34*  (2006.01)

(52) U.S. Cl.
  USPC ............... 205/88; 205/98; 205/101; 205/200; 205/201; 205/202; 205/203; 205/229; 205/322; 205/324

(58) Field of Classification Search
  USPC .................................................... 205/88, 101
  See application file for complete search history.

(56) References Cited

U.S. PATENT DOCUMENTS 3,955,556 A * 5/1976 Pangborn et al. ............ 122/18.1
4,239,607 A * 12/1980 Maget .......................... 205/348

(Continued)

FOREIGN PATENT DOCUMENTS

EP    1 457 588 A1 * 9/2004
GB    706739         4/1954

(Continued)

OTHER PUBLICATIONS

F. A. Lowenheim, Electroplating, McGraw-Hill Book Company, New York, 1978, pp. 4452-4466.*

(Continued)

*Primary Examiner* — Patrick Ryan
*Assistant Examiner* — William Leader
(74) *Attorney, Agent, or Firm* — Jordan and Hamburg LLP

(57) ABSTRACT

To provide an anodic oxidation method, a titanium oxide film manufacturing method and a catalyst carrying method which is suitable, for example, for anodic oxidation of aluminum, titanium and catalyst carrying on the surface of alumite (registered trademark), capable of generating an oxide film at a low cost and rapidly by eliminating the use of a strongly acid or strongly basic electrolytic solution and using a carbonated water as an electrolytic solution, capable of controlling the sealing treatment of oxide film through a simple method, capable of effecting the oxide film dyeing and catalyst carrying rationally and easily, and capable of effecting the catalyst carrying safely and surely without eroding a base material.
An object (3) to be treated is electrolyzed in an electrolytic solution received in a treatment vessel (1) serving the object (3) as an anodic electrode.
It is an anodic oxidation method in which an oxide film is generated on the surface of the object (3).
A carbonated water of a predetermined acid concentration generated by dissolving a pressurized carbon dioxide in a predetermined quantity of water (7) is used as the electrolytic solution.

2 Claims, 7 Drawing Sheets

U.S. PATENT DOCUMENTS

| | | | |
|---|---|---|---|
| 5,409,156 A * | 4/1995 | Tsuji et al. | 228/120 |
| 5,608,267 A * | 3/1997 | Mahulikar et al. | 257/796 |
| 5,747,180 A * | 5/1998 | Miller et al. | 428/601 |
| 6,869,671 B1 * | 3/2005 | Crouse et al. | 428/304.4 |
| 7,078,155 B2 * | 7/2006 | Murota et al. | 430/278.1 |

FOREIGN PATENT DOCUMENTS

| | | |
|---|---|---|
| JP | 49-134 | 1/1974 |
| JP | 62-297497 | 12/1987 |
| JP | 63-69999 | 3/1988 |
| JP | 64-083513 | 3/1989 |
| JP | 07-008797 | 1/1995 |
| JP | 8-41686 | 2/1996 |
| JP | 8-246192 | 9/1996 |
| JP | 9-176892 | 7/1997 |
| JP | 10-73226 | 3/1998 |
| JP | 10-73227 | 3/1998 |
| JP | 10-80622 | 3/1998 |
| JP | 2000-55794 | 2/2000 |
| JP | 2000-212797 | 8/2000 |
| JP | 2001-224962 | 8/2001 |
| JP | 2001-239161 | 9/2001 |
| JP | 2001-303296 | 10/2001 |
| JP | 2003-071286 | 3/2003 |
| JP | 2003-073868 | 3/2003 |
| JP | 2003-183888 | 7/2003 |
| JP | 2003-321791 | 11/2003 |
| JP | 3830386 | 7/2006 |
| WO | WO 00/77135 * | 12/2000 |
| WO | WO 03/054253 | 7/2003 |

OTHER PUBLICATIONS

F. A. Lowenheim, Electroplating, McGraw-Hill Book Co., 1978, pp. 138-139, 296-299.*

* cited by examiner

F I G . 2
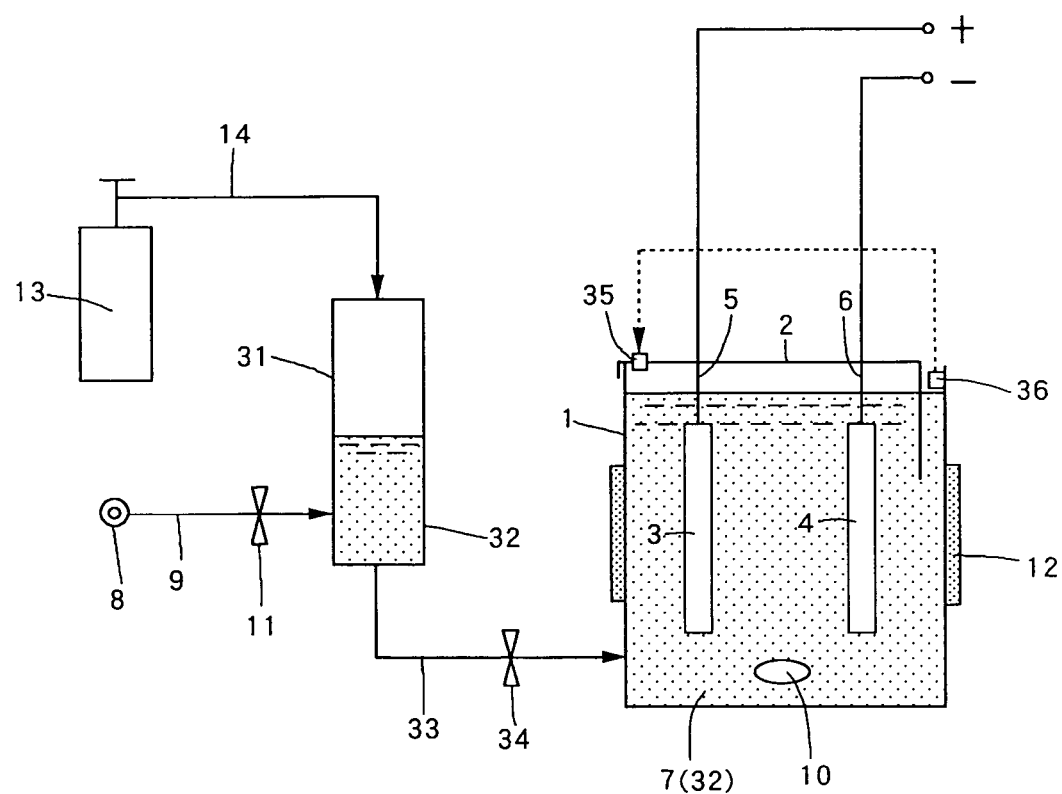

ANODIC OXIDATION

BEFORE CATALYST CARRIAGE

CATALYST CARRIAGE UNDERGOING

ANODIC OXIDATION METHOD AND PRODUCTION FOR TITANIUM OXIDE COATING AND METHOD OF SUPPORTING CATALYST

TECHNICAL FIELD

The present invention relates to an anodic oxidation method, a titanium oxide film manufacturing method and a catalyst carrying method which is suitable, for example, for anodic oxidation of aluminum, titanium and catalyst carrying on the surface of alumite (registered trademark), capable of generating an oxide film at a low cost and rapidly by eliminating the use of a strongly acid or strongly basic electrolytic solution and using a carbonated water as an electrolytic solution, capable of improving the oxide film generating operation and rationalizing the water discharging treatment, capable of controlling the sealing treatment of oxide film through a simple method, capable of effecting the oxide film dyeing and catalyst carrying rationally and easily, applicable to an oxide film dyeing method and a catalyst manufacturing method, capable of effecting the catalyst carrying safely and surely without eroding a base material, accurately and efficiently, recollecting a catalyst material and a catalyst solution which have been subjected to the catalyst carrying and reutilizing thereof.

BACKGROUND ART

An anodic oxidation method is known in which an oxide film having a predetermined thickness is artificially generated on a base surface of aluminum, for example. According to this method, an electrolytic solution having a strongly acid property such as sulfuric acid and oxalic acid is received in a treatment vessel, an aluminum-made object to be treated is received in this electrolytic solution, and an oxide film is formed on the base surface of the aluminum by oxidation reaction with the electrolytic solution serving the object as an anode (see, for example, Patent Document 1).

However, this conventional oxide film generating method has such problems that an electrolytic solution having a strongly acid property such as sulfuric acid and oxalic acid is required, a special water discharging equipment is required for discharging the electrolytic solution, thus increasing the production cost and equipment cost, and operation is obliged to be conducted under such a circumstance that a toxic gas is generated.

Moreover, in case an oxide film having a high degree of hardness is to be generated, the temperature of the treatment vessel must be set to low, and in order to prevent increase in temperature due to heat radiation at the time of growth of the oxide film, a cooling equipment and its cooling operation are required. Thus, the production cost and the equipment cost are increased, and productivity is decreased.

Incidentally, the oxide film comprises a porous bulk layer and a barrier layer composed of an amorphous alumina ($Al_2O_3$), and the bulk layer on the outer surface side has a plurality of pores formed therein. However, since the oxide film itself is poor in corrosion resistance and it has a white or colorless transparent color, it is a normal practice to conduct the sealing treatment in order to enhance the corrosion resistance and the dyeing treatment in order to enhance the decorative property.

Of all, the sealing treatment employs a method in which the oxide film is treated with a high temperature pressurized water vapor or boiled in a boiled water so that the pores are sealed or reduced in size (for example, Patent Document 2).

In the dyeing treatment, after the oxide film is generated, it is electrolyzed in a solution with metal salt dissolved therein so that metal or metal compound is deposited in the pore and then dyed (see, for example, Patent Document 3).

However, the above-mentioned sealing treatment has such problems that a treatment vessel is required separately from the anodic oxidation treatment vessel and an object to be treated must be shifted to another vessel after the anodic oxidation is carried out, thereby the equipment cost is increased and the process becomes complicated.

Moreover, since the conventional sealing treatment generally aims at improvement of corrosion resistance, it is difficult to realize an ornamental processing of high quality and a processing which satisfies both the corrosion resistance and ornamental property.

The adjustment or management of such corrosion resistance and ornamental property is performed by means of generation of the oxide film, the number of pores, and the sealing treatment. However, it is difficult to obtain a predetermined oxide film by adjusting the density of electric current. It is also difficult to adjust the diameter of the pores by hydration treatment through temperature management.

On the other hand, the above-mentioned oxide film draws attention in various fields as a catalyst body capable of carrying various kinds of catalysts. Many proposals have been made as to a method for manufacturing a catalyst body.

In the method for manufacturing a catalyst body, for example, an alumina layer is formed on the surface of an aluminum as a base by anodic oxidation, thus obtained alumina layer is subjected to hydration treatment at 10 degrees C. through 80 degrees C., after the diameter of pores is enlargingly adjusted to 200 A through 400 A, the resultant is immersed into a solution containing a silica source, then baked at 300 degrees C. through 550 degrees C., and after baking, a catalyst is carried on the silica coating surface (see, for example, Patent Documents 4 and 5).

However, the conventional method for manufacturing a catalyst body requires various processes and temperature management, and is thus complicated and time and labor consuming. Moreover, the equipment cost is increased and the manufacturing cost is also increased. In addition, it is difficult to obtain a sufficient precision in adjustment of enlargement of the diameter of the pores by hydration treatment and the yield of production is inferior.

On the other hand, recently, utilization of an optical catalyst have drawn attention in various fields. Of all, utilization and development of titanium oxide draw attention.

Regarding titanium oxide, various manufacturing method have heretofore been proposed. Of all, as a manufacturing method utilizing an anodic oxidation method, there is known a method in which, for example, a pure titanium-base material or titanium-based alloy material is anodically oxidized in a diluted acidic solution such as phosphoric acid and after this anodic oxidation, the resultant is heated at 300 degrees C. through 800 degrees C. in an acidic atmosphere (see, for example, Patent Document 6).

However, in the method for manufacturing titanium oxide, the discharge of exhaust solution is restricted in the process of anodic oxidation as it contains an environmental pollutant.

Since phosphoric acid is used, a special water discharge processing equipment is required and thus, the equipment cost is increased and the manufacturing cost is also increased.

Incidentally, as means for cleaning the exhaust gas discharged from automobiles and for capturing an odor substance, there is known an alumite catalyst reacting device in which the device wall of a reaction chamber for allowing the gas, which is to be cleaned, to be flowed therein is subjected to alumite treatment and a catalyst is carried on the alumite treated surface. And as its catalyst, a metal catalyst such as a metal of platinum group and its alloy, gold and palladium is used (see, for example, Patent Documents 4, 5 and 7).

Of all, palladium is generated from palladium chloride and widely used as its catalytic effect is high. However, since palladium has low solubility with water and it forms a hydrate in an aqueous solution, its catalyst carrying capability is lowered.

So, it is a normal practice that palladium is dissolved in an organic solvent such as acetone and ethanol so that its catalyst carrying capability is increased. Therefore, the catalyst carrying solution becomes expensive and alumite is eroded at the time palladium chloride is dissolved in an acidic solution such as hydrochloric acid and carried on the alumite. For this reason, it is difficult to employ palladium.

DISCLOSURE OF RELATED ART

Patent Document 1
Official Gazette of Japanese Patent Application Laid-Open No. H09-176892
Patent Document 2
Official Gazette of Japanese Patent Application Laid-Open No. 2000-212797
Patent Document 3
Official Gazette of Japanese Patent Application Laid-Open No. 2000-55794
Patent Document 4
Official Gazette of Japanese Patent Application Laid-Open No. H10-73226
Patent Document 5
Official Gazette of Japanese Patent Application Laid-Open No. H10-73227
Official Gazette of Japanese Patent Application Laid-Open No. H08-246192
Official Gazette of Japanese Patent Application Laid-Open No. H10-80622

It is, therefore, a main object of the present invention to provided, in order to solve the above-mentioned problems, an anodic oxidation method, which is suitable, for example, for anodic oxidation of aluminum, titanium and catalyst carrying on the surface of alumite (registered trademark), capable of generating an oxide film at a low cost and rapidly by eliminating the use of a strongly acid or strongly basic electrolytic solution and using a carbonated water as an electrolytic solution, capable of improving the oxide film generating operation and rationalizing the water discharging treatment, capable of controlling the sealing treatment of oxide film through a simple method, capable of effecting the oxide film dyeing and catalyst carrying rationally and easily, and applicable to an oxide film dyeing method and a catalyst manufacturing method.

Another object of the present invention is to provide a method for manufacturing a titanium oxide film capable of obtaining a safe electrolytic solution which is adaptive to the environment standard at a low cost, forming an oxide film titanium film safely and easily, improving the operation, discharging the solution safely and simply without inviting the environmental pollution, and rationalizing the solution discharging treatment.

A further object of the present invention is to provide a method for carrying a catalyst which is suitable for carrying a catalyst, for example, on the surface of alumite, capable of manufacturing a solution for carrying a catalyst from an inexpensive raw material, effecting the catalyst carrying safely and surely without eroding a base material, accurately and efficiently, and recollecting a catalyst material and a catalyst solution which have been subjected to the catalyst carrying and reutilizing thereof.

DISCLOSURE OF THE INVENTION

According to the present invention, there is provided an anodic oxidation method for electrolyzing an object to be treated in an electrolytic solution received in a receiving vessel serving the object as an anode and generating an oxide film on a surface of the object, wherein a carbonated water of a predetermined acid concentration generated by dissolving a pressurized carbon dioxide in a predetermined quantity of water is used as the electrolytic solution, the electrolytic solution is set to a predetermined pressure and temperature, a sealing suppressing ion of an oxide film is mixed into the electrolytic solution. Accordingly, generation of the oxide film, sealing treatment of the oxide film and sealing suppressing treatment of the oxide film can be carried out simultaneously, without a need of shifting the object. Those treatments can be conducted rationally and rapidly. The sealing treatment of the oxide film can be controlled in a simple manner. Any desired dyeing of the oxide film utilizing the pores and catalyst carrying can be effected rationally and accurately.

Moreover, the electrolytic solution can be obtained at a low cost, the oxide film can be generated safely and easily, operation can be improved, the electrolytic solution can be discharged safely and easily by means of pressure reduction treatment after the solution is used, and the solution discharging treatment can be rationalized without a need of any special solution discharging equipment.

Moreover, according to an anodic oxidation method of the present invention, generation of the oxide film, sealing treatment of the oxide film and sealing suppressing treatment of the oxide film are carried out simultaneously. Accordingly, those treatments can be conducted rationally and rapidly without a need of shifting the object. The sealing treatment of the oxide film can be controlled in a simple manner. Any dyeing of the oxide film utilizing the pores and catalyst carrying can be conducted rationally and accurately.

Moreover, according to an anodic oxidation method of the present invention, the oxide film sealing treatment can be controlled through the sealing suppressing ion. Accordingly, the controlling can be realized in a simple manner and at a low cost.

According to an anodic oxidation method of the present invention, an oxide film, which has been subjected to the sealing treatment and sealing suppressing treatment, is immersed in the electrolytic solution for a predetermined time, so that the pores of the oxide film can be enlarged in diameter. Accordingly, it is no more required to take such a trouble as to shift the object and to make such a complicated temperature management compared with the conventional method in which the pores are enlarged in diameter by hydration reaction which is required by temperature management. Thus, the treatment can be conducted easily and rapidly.

Moreover, according to an anodic oxidation method of the present invention, a prescribed dye is precipitated or absorbed on the pores of the oxide film, which has been subjected to the sealing treatment and sealing suppressing treatment, or prescribed catalyst pieces are carried thereon. Accordingly, any dyeing of the oxide film utilizing the pores and catalyst carrying can be conducted rationally and accurately. Thus, the method of the present invention can be applied to a new oxide film dyeing method and a catalyst body manufacturing method.

Moreover, according to an anodic oxidation method of the present invention, the catalyst pieces are powdery titanium or titanium alloy. Accordingly, a fine and stable catalyst body can be obtained for a base material such as aluminum, titanium and magnesium.

According to an anodic oxidation method of the present invention, a carbonated water of a predetermined acid concentration generated by dissolving a water in a supercritical or subcritical carbon dioxide is used as an electrolytic solution. Accordingly, there can be obtained a thin and fine oxide film.

According to a method for manufacturing a titanium oxide film of the present invention, a titanium or titanium alloy is electrolyzed in an electrolytic solution received in a receiving vessel serving the titanium or titanium alloy as an anode and an oxide film is formed on a surface of the titanium or titanium alloy, wherein a carbonated water of a predetermined acid concentration generated by dissolving a pressurized carbon dioxide in a predetermined quantity of water is used as the electrolytic solution. Accordingly, a safe electrolytic solution can be obtained at a low cost which is adaptive to the environment standard, an oxide film titanium film can be formed safely and easily, the operation can be improved, the solution can be discharged safely and simply without inviting the environmental pollution, and the solution discharging treatment can be rationalized without a need of a special solution discharging equipment.

Moreover, according to a method for manufacturing a titanium oxide film of the present invention, a carbonated water of a predetermined acid concentration generated by dissolving a water in a supercritical or subcritical carbon dioxide is used as an electrolytic solution. Accordingly, there can be obtained a thin and fine titanium oxide film.

According to a catalyst carrying method of the present invention, an oxide film of an object to be treated is contacted with a catalyst carrying solution containing a catalyst material and the catalyst is carried on a surface of the oxide film, wherein the catalyst carrying solution is formed by a carbonated water containing a catalyst material. Accordingly, the catalyst carrying solution can be made by a carbonated water which can be obtained by dissolving a carbon dioxide in water which is an inexpensive raw material. Thus, the catalyst carrying solution can be made easily and at a low cost. By dissolving a catalyst material in a carbonated water which is made to have a predetermined acid concentration at a low cost and easily, there can be eliminated such a conventionally experienced irrationality that a catalyst material is dissolved in an organic solvent such as acetone and methanol which are expensive. Moreover, erosion of the oxide film can be prevented by the carbonated water and the catalyst carrying can be conducted safely and surely.

Moreover, according to a catalyst carrying method of the present invention, the catalyst carrying is conducted under a high pressure. The catalyst material can be permeated into the oxide film highly efficiently, the catalyst carrying can be conducted precisely and efficiently, and improvement of quality of the catalyst carrying and improvement of productivity can be achieved.

Moreover, according to a catalyst carrying method of the present invention, the carbonated water is a highly pressurized carbonated water. Accordingly, the catalyst carrying solution can rapidly be prepared to have a predetermined acid concentration. Moreover, by forming the high pressure environment of the catalyst carrying with a highly pressurized carbonated water, the environment can be set comparatively easily compared with a case wherein the high pressure environment is set only with a supercritical carbon dioxide.

According to a catalyst carrying method of the present invention, the highly pressurized catalyst carrying solution is lowered in pressure so as to be separated into a carbonated water and a catalyst material, and the carbonated water and the catalyst material are recollected. Accordingly, the carbon dioxide and catalyst material can be utilized effectively, and rationalization and productivity can be enhanced.

Moreover, according to a catalyst carrying method of the present invention, a water, which has been separated from the carbonated water, can be discharged. Accordingly, the solution can be discharged without a need of a special solution discharging equipment such as a neutralizing equipment and without any worry about the environment pollution.

The above objects, features and advantages of the present invention will become more manifest from the following detailed description with reference to the accompanying drawings.

BRIEF DESCRIPTION OF DRAWINGS

FIG. 2 is an explanatory view showing a second embodiment of the present invention in which an electrolytic solution is generated at the outside of an treatment vessel, mixed with a sealing suppressing ion and then supplied to the treatment vessel.

BEST MODE FOR CARRYING OUT THE INVENTION

Figure 1:
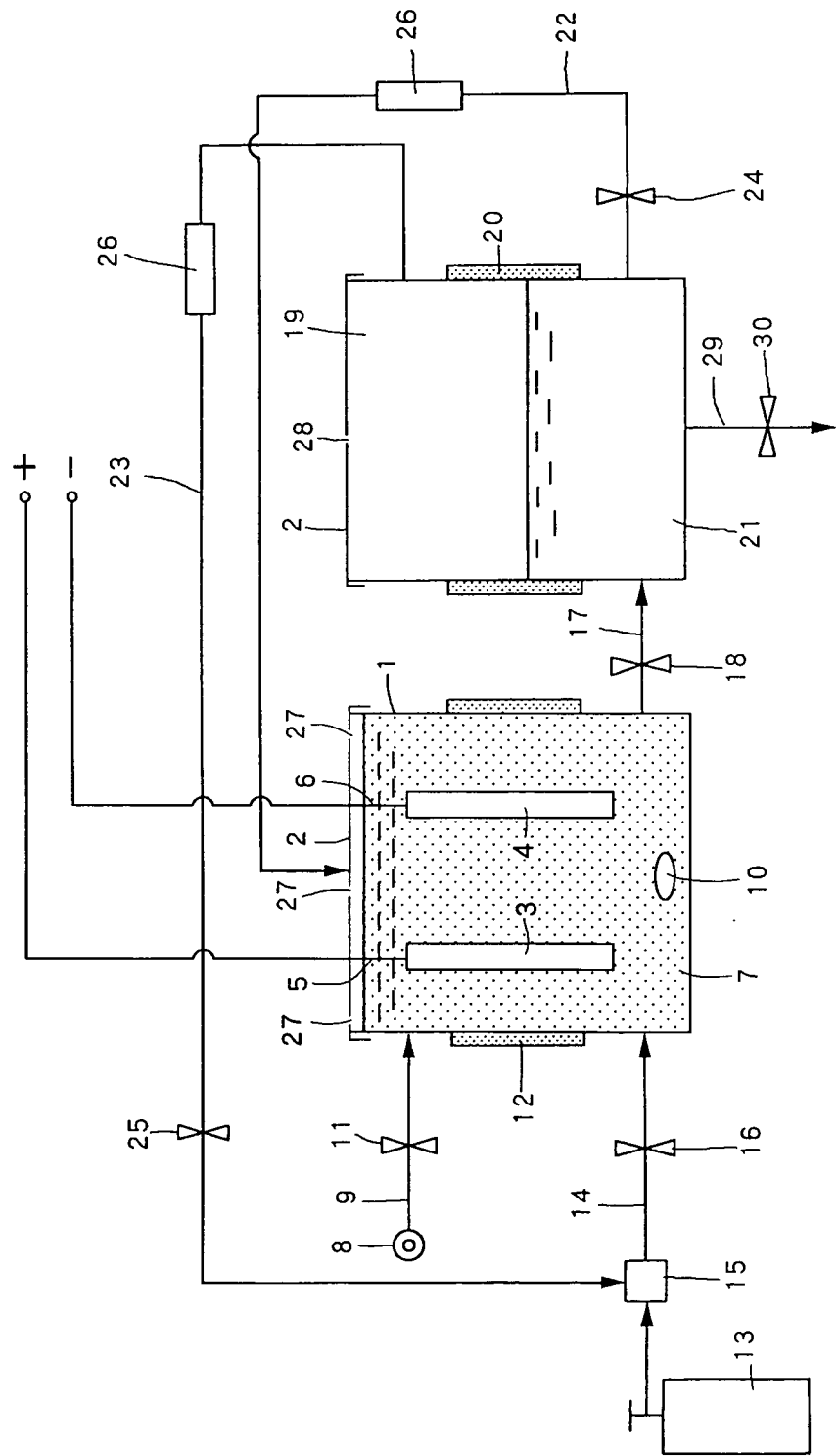
FIG. 1 is an explanatory view showing one embodiment of the present invention in which the present invention is applied to an anodic oxidation treatment of an aluminum product.

The illustrated embodiment of the present invention will be described hereinafter, in which the present invention is applied to an anodic oxidation method of aluminum or its alloy as an object to be treated. In FIG. 1, reference numeral 1 denotes a stainless steel-made treatment vessel with a bottom. Lining of vinyl chloride or the like is applied to the inner surface of the treatment vessel 1. A cover member 2 is removably mounted on an upper opening part thereof.

An aluminum-made object 3 to be treated as an object on which an anodic oxide film is generated and a cathode material 4 such as a lead plate are hung within the treatment vessel 1 through hooks 5, 6 such that they can be inserted in and removed from the vessel 1. An anode and a cathode of a power source apparatus are connected to them.

Water 7 such as service water, pure water and the like as a material for generating an electrolytic solution is received in the treatment vessel 1, and a feed water pipe 9 communicated with a feed water source 8 is connected to its upper peripheral surface.

In the illustration, reference numeral 10 denotes an agitator such as a stirrer received in the bottom part of the treatment vessel 1; 11, a stop valve inserted in the feed water pipe 9; and 12, a heater mounted on a peripheral surface of the treatment vessel 1, respectively. This heater 12 can heat the water 7 to a predetermined temperature, 30 to 40 degrees C. in this embodiment. In this case, the warm water heated to the above-mentioned temperature may be supplied to the treatment vessel 1.

A gas container 13, which contains a safe and stable pressurized liquid or pressurized gas such as, for example, carbon dioxide, is installed at an outer part of the treatment vessel 1 as a material for generating an electrolytic solution. A gas conduit 14 for such carbon dioxide is connected to a lower peripheral surface of the treatment vessel 1 through a compression pump 15 and a stop valve 16.

The compression pump 15 can pressurized the carbon dioxide to a predetermined pressure, from atmospheric pressure or higher to a subcritical or supper critical pressure (7.4 MPa) or higher in this embodiment. The compression pump 15 is adapted to supply the carbon dioxide into the treatment vessel 1 so that the carbon dioxide is dissolved in the water 7 to generate a carbonated ($H_2CO_3$) water as an electrolytic water.

Sealing suppressing or inhibiting ion, for example, chloride ion, radical of sulfuric acid ($SO_4^{2-}$), phosphoric ion ($PO_4^{3-}$) and fluorine ion ($F^-$) of the oxide film can be supplied into the treatment vessel 1 through a suitable means.

As the sealing suppressing ion, chloride ion is used in this embodiment. To this end, a predetermined quantity of hydrochloric acid (HCL) is supplied to water. In this case, if service water containing hydrochloride ion is used for example, the intended ion can be obtained easily and at a low cost.

A communication pipe 17 is connected to a lower part of the treatment vessel 1. A stop valve 18 is inserted in this pipe 17. A downstream side end part of the communication pipe 17 is connected to a storage tank 19.

The storage tank 19 is constructed in a substantially same manner and same capacity as the treatment vessel 1. A heater 20 is mounted on a peripheral surface of the storage tank 19 and adapted to heat the storage solution received in the tank 19 to a predetermined temperature.

In this embodiment, the storage solution 21 is heated to approximately 50 degrees C. so that the carbonated water as a main composition of the storage solution 21 can be decomposed into water and carbon dioxide.

One ends of return pipes 22, 23 are connected to upper and lower peripheral surfaces of the storage tank 19, respectively and the other ends are connected to the treatment vessel 1 and the compression pump 15, respectively. Owing to this arrangement, the decomposed water and carbon dioxide can be returned to the treatment vessel 1 and the compression pump 15, respectively.

In the illustration, reference numeral 24, 25 denote stop valves which are inserted in the return pipes 22, 23, respectively, and reference numeral 26 denote filters or ion exchange resins which are inserted in the return pipes 22, 23, respectively. Similarly, reference numeral 27, 28 denote air vents formed in the cover members 2, 2.

A discharge pipe 29 is connected to a lower part of the storage tank 19. A downstream side end part of the discharge pipe 29 is communicated with a drainage. Reference numeral 30 denotes a stop valve inserted in the discharge pipe 29.

It should be noted that in this embodiment, the present invention is applied to the process for producing an anodic oxide film but it can likewise be applied to an electropolishing which is substantially same in principle as the anodic oxidation method.

The anodic oxidation method thus constructed requires the treatment vessel 1 which can be opened and closed, the feed water source 8 which can supply the water 7 to the treatment vessel 1, the gas container 13 which can supply a liquid-state or gas-state liquid (liquid carbon dioxide having a high concentration in this embodiment) to the treatment vessel 1, the sealing suppressing or inhibiting ion generating agent of oxide film and the storage tank 19 which can temporarily store a treatment solution after the generating treatment of the anodic oxide film.

That is, the water 7 and carbon dioxide, which are inexpensive and safe, are used instead of the use of the conventional electrolytic solution having a strong acid property caused by sulfuric acid and oxalic acid. By doing so, the generating cost can be reduced, the operating environment under the generation of toxic gas can be improved, the safety of operation can be obtained, and the equipment cost can be reduced without a need of a special solution discharging equipment such as the conventional neutralizing equipment by eliminating the use of an electrolytic solution having a strongly acid property.

Moreover, since the formation of the oxide film and the sealing treatment of pores formed in the oxide film can be conducted simultaneously as later described, the trouble for conducting those processes separately and the trouble for shifting the object to the respective treatment vessels can be eliminated, and they can be conducted rationally.

Moreover, the electrolytic solution of a carbonated water is normally agitated by the agitator 10. By doing so, a large amount of fine air bubble is generated in the electrolytic solution, and movement of this large amount of air bubble enhances the heat radiation of the vessel 1 so that the vessel 1 is prevented from increasing in temperature.

Accordingly, increase in temperature of the electrolytic solution caused, for example, by the growth of oxide film can be prevented, and by maintaining the constant temperature state, the generation of oxide film can be stabilized and a good oxide film can be obtained. On the other hand, the cooling means, which would otherwise be required, can be eliminated or the capacity of such cooling means can be reduced.

Moreover, the treatment solution, which has been subjected to the anodic oxidation treatment and sealing treatment, is, as later described, decomposed into water and carbon dioxide in the storage tank 19, and the decomposed water and carbon dioxide are returned to the treatment vessel 1 and the compression pump 15 so that they can be re-utilized. Accordingly, effective utilization and reduction of consumption thereof can be achieved.

Next, in case the object 3 is to be subjected to anodic oxidation treatment and sealing treatment with the use of the above-mentioned treatment apparatus, the object 3 is preliminarily subjected to prior treatment. After subjecting the object 3 to degreasing treatment and etching or chemical polishing or electropolishing treatment, or satin finishing treatment, the object 3 is received in the treatment vessel 1 connected to the anodic electrode of the power source apparatus.

Thereafter, the cover member 2 is mounted, the water 7 is supplied to the treatment vessel 1 from the feed water source 8, and the object 3 is immersed in the water 7.

After a predetermined quantity of water 7 is supplied to the treatment vessel 1, a predetermined quantity of hydrochloric acid (HCL), which is a chlorine ion generating agent, is supplied to the water 7 as a sealing suppressing in generating agent of oxide film, so that chlorine ion is generated and dispersed in the water 7.

Then, carbon dioxide is supplied to the treatment vessel 1 from the gas container 7. The carbon dioxide is then pressurized to have a predetermined pressure which is equal to the atmospheric pressure or higher in this embodiment, at the compression pump 15, and the water 7 is further heated to 30 to 40 degrees C. through the heater 12.

Before or after the above-mentioned treatment, the agitator 10 is actuated to agitate the electrolytic solution 7 so that the temperature distribution, the concentration distribution and the ion distribution are uniformed.

By doing so, the carbon dioxide is vigorously ascended in the form of bubbling in the water contained in the treatment vessel 1 with the agitating effect of the agitator 10 and dissolved in the water 7 to generate carbonic acid ($H_2CO_3$) so that the water 7 is oxidized.

In this case, the carbon dioxide is pressurized to the level equal to the atmospheric pressure or higher and the water 7 is heated to enhance the carbon dioxide to be dissolved in the water 7. Accordingly, the acid concentration of the water 7 is increased to form an acid concentration (pH3 to 4) large enough to generate oxide film.

Since the acid concentration of the carbonated water is reduced with the passage of its using time, carbon dioxide should be fed timely so that a predetermined acid concentration can be maintained.

Under the above-mentioned circumstance, a positive current is supplied to the object 3. Then, the object 3 effects oxidation reaction with the oxidized electrolytic solution, so that an anodic oxide film of amorphous alumina ($Al_2O_3$) is formed on the base surface of the object 3. At the same time, the oxide film is subjected to sealing treatment under a suppressed condition.

That is, with the progress of generation of the oxide film, a porous bulk layer and a barrier layer consisting of an amorphous alumina ($Al_2O_3$) are formed on the surface of the object 3, and a large number of pores are formed in the bulk layer on the surface side.

The generated oxide film partly effects the hydration reaction under the pressure and heating of the carbonic water, and a hydrate is generated in the pores. The hydrate is grown or expanded to block or reduce the pores, thus effecting the sealing treatment.

At that time, the chloride ion dispersed in the carbonated water is attracted by water molecule. The chloride ion is surrounded by several pieces of water molecule and hydrated. As a result, the chloride ions exist separately from other ions to suppress the growth or expansion of bayerite or boehmite which is hydrate of the pores, thereby suppressing the sealing treatment.

In this case, the sealing treatment suppression by chloride ion has a relation with the concentration of chloride ion, and temperature and pressure of electrolytic solution. As the concentration of chloride ion is increased and as the temperature and pressure of electrolytic solution are increased, the effect of sealing treatment suppression is increased.

Accordingly, by organically adjusting, either individually or mutually, the concentration of chloride ion, and temperature and pressure of electrolytic solution, the pores can be adjusted precisely.

For example, controlling can be made over a large range from a non suppression state of sealing treatment, i.e., normal sealing state which is achieved by reducing the concentration of chloride ion as much as possible, to a high-suppression state of sealing treatment, i.e., non-sealing treatment state which is achieved by increasing the concentration of chloride ion as much as possible within an allowable range. Thus, various types of dyeing of oxide film and various ways of catalyst carrying, which are to be conducted thereafter, can rationally be conducted through the pours After controlling of density of the pores, for example, oxide film is immersed in a carbonated water for a predetermined time. By doing so, the pore part from the bulk layer to the barrier layer is oxidized in a carbonated water, thereby enabling to enlarge the diameter of the pore. Accordingly, there is no more required to have a separate treatment vessel and no more required to have such a troublesome shifting operation of the object 3 which are required in the conventional immersing treatment in a hot water.

In this way, the anodic oxidation treatment, sealing treatment of oxide film and sealing suppressing treatment are conducted simultaneously for predetermined time. By doing so an anodic oxide film having a sufficient thickness and pore density is obtained. Then, the supply of carbon dioxide is stopped and the agitator 10 is also stopped operation. The stop valve 18 is then opened.

By doing so, the inside pressure of the treatment vessel 1 is reduced and the dissolving degree of the carbon dioxide is lowered. The treatment solution is pushed out into the storage tank 19 through the communication pipe 17. When the total quantity of the treatment solution is moved to the storage tank 19, the stop valve 18 is closed.

As a result, the storage solution 21 stored in the storage tank 19 is more reduced in pressure than in the treatment vessel 1 and the dissolving degree of the carbon dioxide is lowered. Accordingly, the acid concentration is rapidly reduced thus eliminating the fear of actual adverse effect to the environment. Then, the stop valve 28 is opened so that the storage solution 21 can be discharged directly into the drainage from the discharge pipe 29.

In case a heavy metal, for example, exists in the storage tank 19, the carbon dioxide is disappeared from the storage solution 21, so that the heavy metal is separated from the carbonated water and deposited in the tank 19.

Accordingly, the heavy metal can be recollected together with other foreign matter and oxide film through a filter (not shown) which is inserted in the discharge pipe 29. Therefore, the safety of discharging water is ensured to prevent the environmental pollution. After recollection of the heavy metal, it can be disposed as a normal waste.

On the other hand, in the above embodiment, the storage solution 21 can be re-utilized. In that case, the heater 20 is heated to heat the storage solution 21 stored in the storage tank 19 to approximately 50 degrees C.

By doing so, the carbonated water in the storage solution 21 is separated into carbon dioxide and water. The carbon dioxide and water are separated into gas-liquid two layers.

That is, the gaseous carbon dioxide is located at an upper position and the water is located at a lower position.

Then, the stop valves 25, 26 are opened. As a result, the separated carbon dioxide and water are moved to the treatment vessel 1 and the compression pump 15 through the return pipes 22, 23, respectively, so that they can be re-utilized.

At that time, the heavy metal, oxide film and foreign matter are removed from the carbon dioxide and water by the filters 26, 26 inserted in the respective return pipes 22, 23.

At that time, since carbon dioxide is completely removed from the storage solution 21 by the above-mentioned decomposition, the heavy metal, the oxide film, etc. are completely deposited and can, therefore, be recollected with precision.

After the treatment solution in the treatment vessel 1 is discharged, the cover member 2 is opened to take out the object 3 which has been subjected to the anodic oxidation treatment and sealing treatment. Then, the object 3 is shifted to a treatment vessel in the succeeding dyeing process and catalyst body manufacturing process.

The dyeing method and the catalyst body manufacturing method are substantially same as the conventional methods. Of the two methods, the dyeing method can employ any one of such known methods as the immersing method in which porosity of the oxide film is utilized, the electrolytic coloring method in which electrolysis is conducted in a solution containing metal salt dissolved therein and the film of metal or metal compound is precipitated in the pore, the spray-dyeing method in which a dyeing liquid is sprayed onto an object, and the coat-dyeing method in which a dyeing liquid is coated onto an object.

In those dyeing methods, since the diameter of the pore formed in the oxide film and the pore density are prepared in the manner as previously mentioned, a desired dyeing material can correctly be colored to the desired position. Thus, a reliable ornament or design effect can be obtained and the dyeing material can smoothly and surely be permeated in the pores, thus enabling to obtain a stable coloring state.

On the other hand, the catalyst body manufacturing method can employ the known catalyst body manufacturing method in which porosity of the oxide film is utilized.

In this catalyst body manufacturing method, since the pore diameter of the oxide film and the pore density are prepared in the manner as previously mentioned, there can be obtained a carrier which can correctly carry the desired catalyst pieces in a desired position, a reliable and stable catalyst body can be obtained, the catalyst pieces can smoothly and surely be permeated in the pores, thus enabling to obtain a stable catalyst action.

In this case, powder of titanium oxide having a predetermined grain diameter is used as the catalyst pieces and the powder is carried on the pores. By doing so, there can be obtained a metal base material having an optical catalyst function. The metal base material thus obtained has such an advantage as to be able to obtain a desired color tone easily compared with the conventional one which was manufactured in the same manner.

Figure 8:
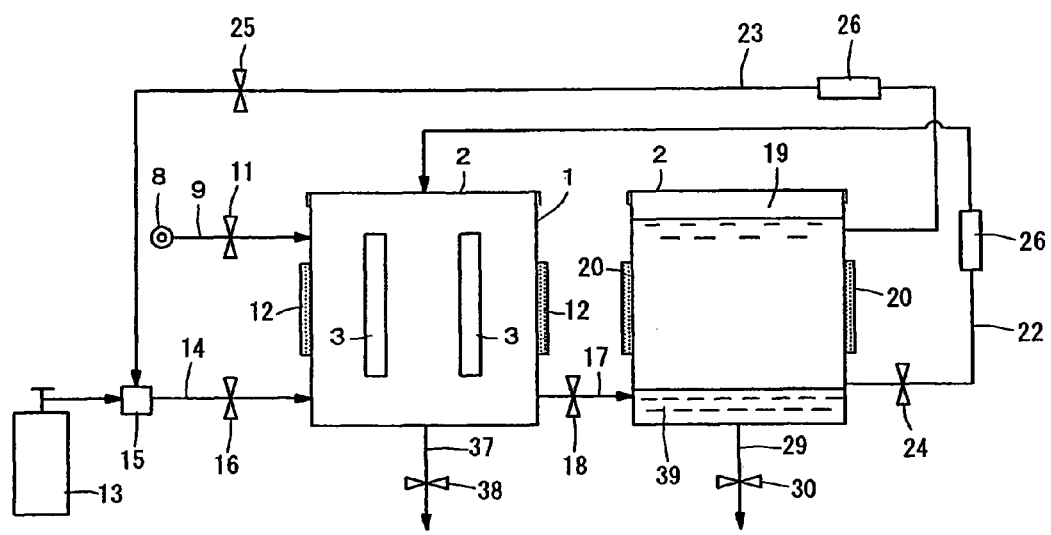
FIG. 8 is a front view showing a state after a catalyst is carried using the anodic oxide film forming apparatus of FIG. 5.

FIGS. 2 and 8 show other embodiments of the present invention, in which the components corresponding to those of the above-mentioned embodiment are denoted by same reference numeral.

Of all, FIG. 2 shows the second embodiment of the present invention. In this second embodiment, an electrolytic solution generating device 31 is installed on the outer side of the treatment vessel 1. This device 31 is connected with the gas conduit 14 and the feed water pipe 9. In the electrolytic solution generating device 31, the carbon dioxide and water introduced therein are reacted so that a carbonated water as an electrolytic solution is generated.

Next, a predetermined quantity of hydrochloric acid (HCL) as a chlorine ion for suppressing the sealing of the oxide film is supplied to the carbonated water 32 and then supplied into the treatment vessel 1 through the conduit 33.

In this case, instead of hydrochloric acid (HCL), a service water containing chlorine ion, for example, may be used. By doing so, chlorine ion can be obtained easily and at a low cost.

In the illustration, reference numeral 34 denotes a stop valve which is inserted in the conduit 33, and reference numeral 35 denotes an air discharge valve which is attached to the cover member 2. This air discharge valve 35 is opened by the detecting operation of a liquid surface sensor 36 which is disposed at an upper part of the treatment vessel 1, so that the carbon dioxide stayed between the electrolytic solution 32 and the cover member 2 is discharged to the outside and the electrolytic solution 32 is prevented from overflowing.

That is, in this embodiment, a carbonated water as an electrolytic solution is generated by the external electrolytic solution generating device 31, and a chlorine ion generating agent is supplied into the treatment vessel 1. By doing so, the carbonated water and the chlorine ion can easily be generated, and the carbonated water generating equipment can be made compact and reduced in cost.

The cover member 2 is formed like bellows which can be bent, expanded and contracted. The entire opening part of the treatment vessel 1 only excluding a part thereof is closed with the cover member 2 and its distal end part is embedded in the electrolytic solution 3 thereby closing the most part of the opening part of the treatment vessel 1.

At the time of generation of the anodic oxide film sealing of the oxide film and suppressing treatment thereof, the treatment vessel 1 is, as shown in FIG. 2, made in a semi-closed state, so that the carbon dioxide staying between the electrolytic solution 32 and the cover member 2 can be prevented from overflowing as much as possible. The carbon dioxide staying for a predetermined time or longer, is discharged by the air discharge valve 35. Thus, safety of operation can be achieved and the electrolytic solution 32 can be prevented from overflowing.

In this case, the carbon dioxide staying at an upper part of the treatment vessel 1 is returned into the electrolytic solution generating device 31. By doing so, effective utilization can be achieved.

The carbon dioxide is fed directly into the treatment vessel 1 separately from the gas conduit 14. Owing to this arrangement, the acid concentration of the treatment vessel 32 can be maintained constant.

Figure 3:
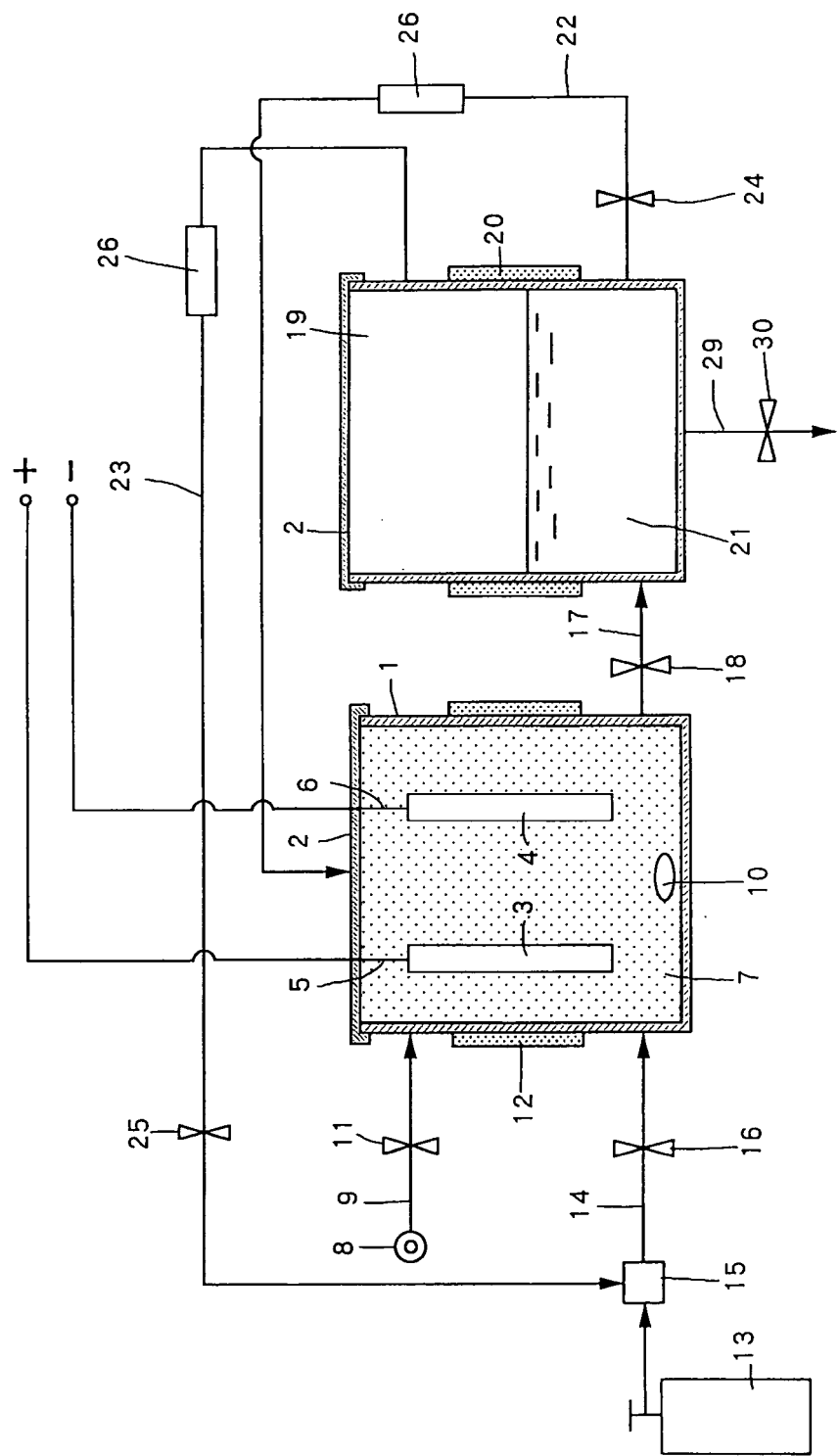
FIG. 3 is an explanatory view showing a third embodiment of the present invention in which a supercritical or subcritical carbon dioxide is introduced into a pressure resisting and hermetically closed treatment vessel and dissolved in water to generate an electrolytic solution, the resultant is mixed with a sealing suppressing ion and further added with a surface active agent so as to effect anodic oxidation treatment.

FIG. 3 shows the third embodiment of the present invention, in which the treatment vessel 1 and the storage tank 19 are formed in a pressure-resisting structure which can be hermetically closed. Carbon dioxide is introduced into the treatment vessel 1 independently or at the same time. The carbon dioxide thus introduced into the vessel 1 can be formed in a supercritical or subcritical state.

In the storage tank 19, the treatment fluid contained in the treatment vessel 1 is temporarily stored therein, the treatment fluid is separated into air and liquid for reproduction, and the water and carbon dioxide thus reproduced are returned into the treatment vessel 1 and the compression pump 15, so that they can be re-utilized.

The object 3, which is not yet subjected to the degreasing treatment, is received in the treatment vessel 1, carbon dioxide is introduced into the treatment vessel 1 after the vessel 1 is hermetically closed, and the carbon dioxide is then formed in a supercritical state, i.e., 7.4 MPa and 31 degrees C. or higher, through the compression pump 15 and the heater 12, so that the object 3 can be degreased and cleaned.

After the degreasing and cleaning treatment, the stop valve 18 is opened to feed the cleaned carbon dioxide into the storage tank 19. After the stop valve 18 is closed, a predetermined quantity of water 7 and carbon dioxide are introduced into the treatment vessel 1 and dissolved to generate a carbonated water.

Then, a predetermined quantity of hydrochloric acid (HCL) as a chlorine ion generating agent for suppressing the sealing of the oxide film is supplied to the carbonated water and a predetermined surface active agent is further added thereto so that an emulsion state of a supercritical carbon dioxide is formed Instead of hydrochloric acid (HCL), a service water containing chlorine ion, for example, may be used. By doing so, chlorine ion can be obtained easily and at a low cost.

In this case, since the inside of the treatment vessel 1 is in a state of high pressure, the dissolving degree of the carbon dioxide with respect to the water 7 can be increased to that extent, and the acid concentration of the carbonated water can be increased.

Then, the agitator 10 is actuated to agitate the electrolytic solution to generate a large amount of fine air bubble in the electrolytic solution, and a positive current is supplied to the object 3, so that the degreased object 3 is oxidatively reacted with the electrolytic solution to thereby generate an anodic oxide film of amorphous alumina ($Al_2O_3$) on the base surface of the object 3.

On the other hand, at the time of generation of the anodic oxide film, the inside of the treatment vessel 1 is held in a high pressure and heated condition. Accordingly, the oxide film is subjected to sealing treatment and at the same time, the sealing treatment is suppressed by the chlorine ion.

In this case, therefore, the sealing treatment is practically suppressed by chlorine ion, and this control is made by adjusting the concentration of chlorine ion, and the pressure and temperature of the treatment vessel 1.

In the case of this embodiment, since the inside of the treatment vessel 1 is held in a high pressure and heating condition compared with the first embodiment, the sealing treatment is conducted actively and precisely, and its suppressing action is relatively lowered. Accordingly, special attention is required for controlling the sealing treatment.

After the treatment is carried out for a predetermined time, the supply of electric current is stopped and the stop valve 18 is opened to feed the water 7 and the carbon dioxide, which are in an air-liquid two-layer state, into the storage tank 19.

At that time, a predetermined flow is generated in the system of the treatment vessel 1. This flow serves to clean the object 3 and also enhance the drying of the object 3. Thus, the washing treatment in water after the anodic oxidation treatment, which was required in the conventional method, can be eliminated.

After the treatment solution in the treatment vessel 1 is discharged, the cover member 2 is opened to take out the object 3 which was subjected to anodic oxidation treatment and sealing treatment and shifted into the receiving vessel used in the following dyeing process or catalyst body manufacturing process. The dyeing method and the catalyst body manufacturing method are substantially same as the above-mentioned method.

Figure 4:
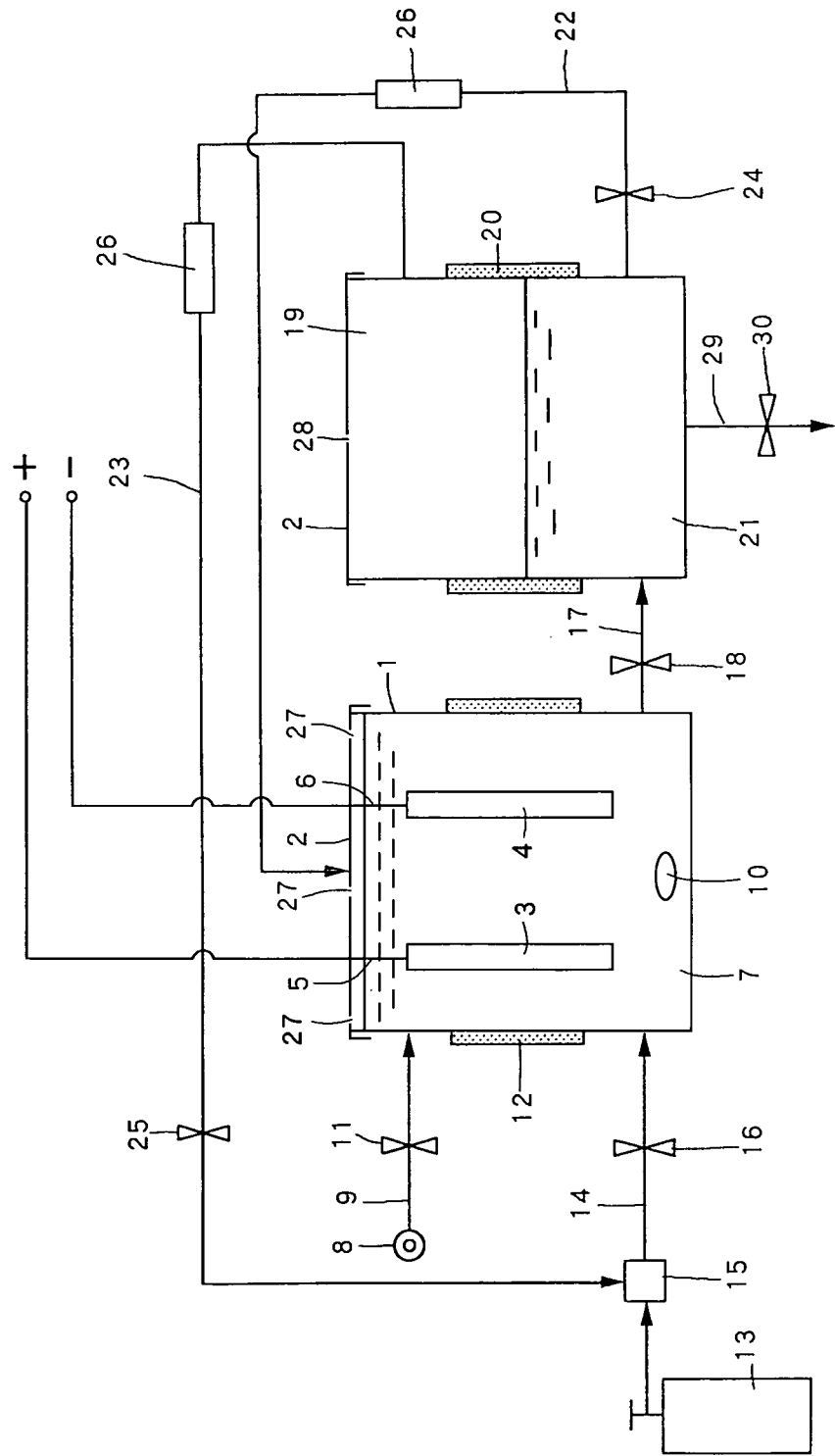
FIG. 4 is an explanatory view showing a fourth embodiment of the present invention in which titanium or titanium alloy is contacted with an anodic electrode and electrolyzed so that a titanium film is formed thereon.
Figure 5:
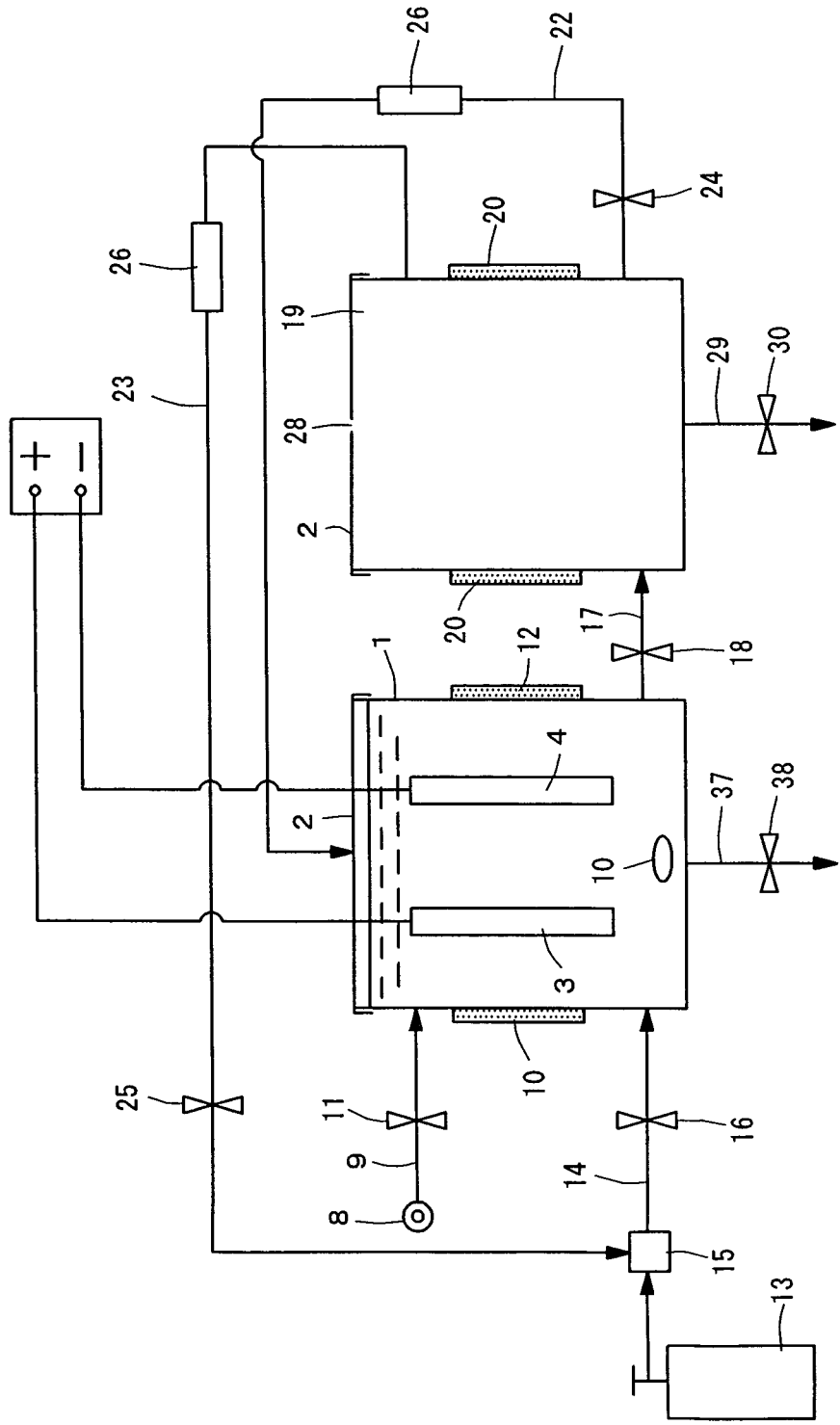
FIG. 5 is an explanatory view showing a fifth embodiment of the present invention in which an anodic oxide film forming apparatus is shown which is applied to a catalyst carrying method according to the present invention.

FIG. 4 shows a fourth embodiment of the present invention. In this fourth embodiment, the present invention is applied to a titanium oxide manufacturing method.

That is, a pure water or distilled water 7 and a carbon dioxide, which is in the form of a pressurized fluid, are supplied into the treatment vessel 1 to generate a carbonated water as an electrolytic solution. Then, a titanium or titanium alloy, which is the washed or acid-pickled object 3 for the anodic oxidation treatment, and a cathodic material 4 such as a platinum plate or the like are immersed in the electrolytic solution and connected to the positive electrode or negative electrode thereof.

Then, a predetermined voltage is applied between the anodic electrode and the cathodic electrode so as to effect electrolysis, and a titanium oxide film compounded with oxygen is formed on the surface of titanium or titanium alloy as the object 3.

The thickness of the film of titanium oxide varies according to kinds, temperature, voltage and time for electrolysis of the electrolytic solution, and is a few angstroms or a few microns.

The film of the titanium oxide forms a transparent film which is high in refractivity. This film takes the role of a prism and reflects the beam of light to cause the light to be interfered with one another so that various kinds of color tones can be exhibited.

After the film of the titanium oxide is formed, the treatment solution is discharged into the storage tank 19 in the same manner as mentioned above, the stored solution 21 in the storage tank 19 is reduced in pressure, acid concentration of the solution 21 is lowered and discharged directly into a sewage through the discharge pipe 29. Therefore, there is no need of a special waste water treatment equipment which was required in the conventional method in which phosphoric acid or the like is used.

As the electrolytic solution, a carbonated water having a predetermined concentration obtained by dissolving water in a supercritical or subcritical carbon dioxide is used. By doing so, formation of the film of titanium oxide is enhanced and an extremely thin and fine titanium oxide film can be obtained rapidly.

FIGS. 5 through 8 show a fifth embodiment of the present invention. In this fifth embodiment, an alumite is formed on the surface of an aluminum which is an object 3 to be treated, by anodic oxidation, and a palladium as a metal catalyst is carried on the surface of the alumite.

In this embodiment, the carbon dioxide can be pressurized to a level ranging from the atmospheric pressure or higher to the supercritical pressure 7.4 MPa or higher through the pressure pump 15. The carbon dioxide having the predetermined pressure is supplied into the electrolytic vessel 1 as a treatment vessel and then, water coming from the feed water pipe 9 is dissolved therein, so that a carbonated water ($H_2CO_3$) as an electrolytic solution can be generated.

The object 3 composed of an aluminum plate and a cathodic member 4 composed of a lead plate or the like, are hung on an upper part of the electrolytic vessel 1, and they are connected, respectively, to a positive electrode and a negative electrode of a power source device, such that they can be immersed in the electrolytic solution.

In the illustration, reference numeral 37 denotes a discharge pipe connected to a bottom part of the electrolytic vessel 1. The discharge pipe 37 is communicated with a sewage, and a stop valve 38 is inserted in the discharge pipe 37.

Reference numeral 39 denotes a catalyst carrying solution which is received in the electrolytic vessel 1 after the anodic oxidation treatment is conducted but before the catalyst carrying treatment is conducted. In this embodiment, an aqueous solution of palladium chloride ($PdCL_2$) as a catalyst forming substance is used as the catalyst carrying solution 39 in this embodiment. A distilled water 40 is received in the electrolytic vessel 1 together with the catalyst carrying solution 39.

Reference numeral 41 denotes a highly pressurized carbonated water which is formed by supplying a highly pressurized carbon dioxide to the electrolytic vessel 1 with the catalyst carrying solution 39 and the distilled water 40 received therein, during the catalyst carrying treatment is undergoing. In this embodiment, the highly pressurized carbonated water 41 is formed to 10 MPa and 80 degrees C.

In case a catalyst is to be carried on the object 3 by a catalyst carrying apparatus which also serves as an oxide film generating apparatus and constructed in the manner as mentioned above, the surface of the object 3 is anodically oxidized first.

That is, the object 3 is preliminarily degreased and cleaned and then hung on the upper part of the electrolytic vessel 1 together with the cathodic member 4. They are then connected to the power source device, and a cover member 2 is attached thereto.

Thereafter, water is supplied into the electrolytic vessel 1 from the water supply source 8, and the object 3 and the cathodic member 4 are immersed in the water. Then, carbon dioxide is supplied into the electrolytic vessel 1 from a gas container 13 and dissolved in water to form a carbonated water as an electrolytic solution in the electrolytic vessel 1.

At that time, the carbon dioxide is pressurized at least to a level equal to the atmospheric pressure or higher through the pressure pump 15, and the water is heated to a temperature level from 30 degrees C. to 40 degrees C. through the heater 12. At that same time, the agitator 10 is actuated to agitate the electrolytic solution, so that the acid concentration and temperature distribution of the electrolytic solution are uniformed.

When the acid concentration of the electrolytic solution is formed to pH3 to 4 which is large enough to form the anodic oxide film, a positive current is supplied to the object 3 and the object 3 is acidically reacted with the electrolytic solution so that an anodic oxide film is formed on the base surface of thereof.

After an anodic oxide film is formed on the object 3, for example, the stop valve 18 is opened to allow the electrolytic solution in the electrolytic vessel 1 to move into the storage tank 19, so that the electrolytic solution, which has been subjected to treatment, is temporarily stored in the storage tank 19 and the inside of the electrolytic vessel 1 is lowered in pressure and brought into an empty state.

In this case, it is accepted that instead of the stop valve 18, a stop valve 38 is opened to allow the electrolytic solution, which has been subjected to treatment, to discharge into a sewage. This also makes that the electrolytic solution is lowered in pressure, the solubility of the carbon dioxide in water is lowered, and the acid concentration of the electrolytic solution is lowered. Therefore, there is no worry about the environmental pollution, etc. by the discharged water, and the discharged water can be treated without a need of special neutralizing equipment.

Thereafter, the object 3 and the cathodic member 4 are separated from the power source device, and they are temporarily recollected from the electrolytic vessel 1. After the electrolytic vessel 1 is cleaned by water washing or the like and dried, a predetermined quantity of catalyst carrying solution 39 composed of palladium chloride ($PdCL_2$) as a catalyst substance generating source is received in the electrolytic vessel 1.

Then, the cover member 2 is mounted, and the object 3, which has been subjected to oxide film forming treatment, is separated from the power source device and hung on the upper part of the electrolytic vessel 1.

Figure 6:
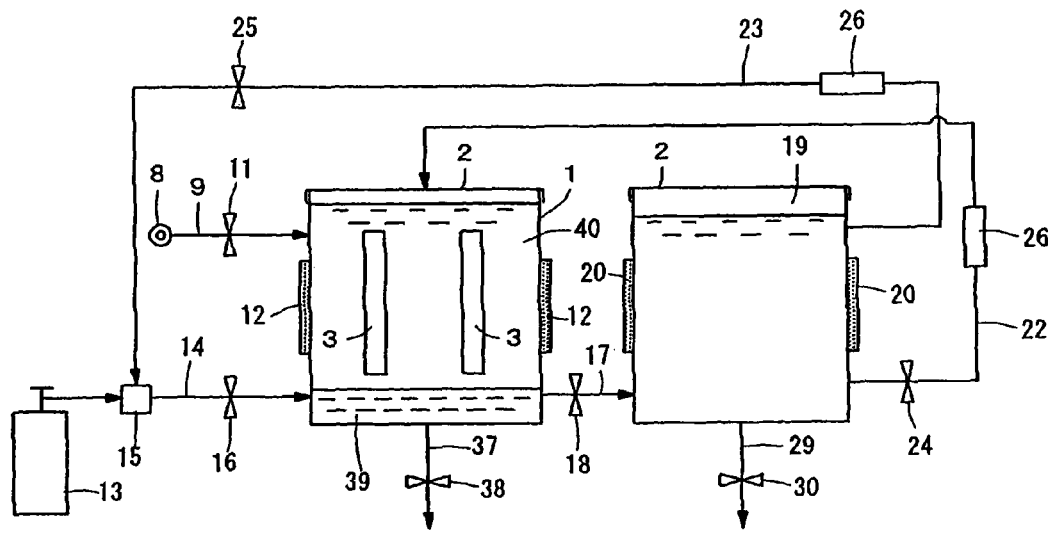
FIG. 6 is a front view showing a state before a catalyst is carried using the anodic oxide film forming apparatus of FIG. 5.

Under the above-mentioned condition, the distilled water 40 is supplied into the electrolytic vessel 1 from the water supply source 8, the catalyst carrying solution 39 is mixed with the distilled water 40, and the object 3 is immersed in the distilled water 40. This condition is as shown in FIG. 6.

Under the above-mentioned condition, the carbon dioxide is supplied into the electrolytic vessel 1 from the gas container 13, and the heater 12 is heated to dissolve the carbon dioxide in the distilled water 40, so that a highly pressurized carbonated water 41 of about pH3 is generated in the electrolytic vessel 1.

In that case, for example, the electrolytic solution in the storage tank 19 is heated by the heater 20 to decompose the electrolytic solution into carbon dioxide and water, then the carbon dioxide and the water are returned to the pressure pump 13 and the electrolytic vessel 1 through the return pipes 22, 23, and the carbon dioxide is pressurized by the pressure pump 13 and then supplied to the electrolytic vessel 1. By doing so, they can be reutilized and the storage tank 19 can be made empty.

In this embodiment, since the highly pressurized carbon dioxide is dissolved in the distilled water 40, solubility of the carbon dioxide can be increased, a predetermined quantity of carbonated water can be obtained rapidly, and a catalyst carrying is effected by palladium as a catalyst substance, since palladium chloride is dissolved rapidly in this highly pressurized carbonated water 41.

Figure 7:
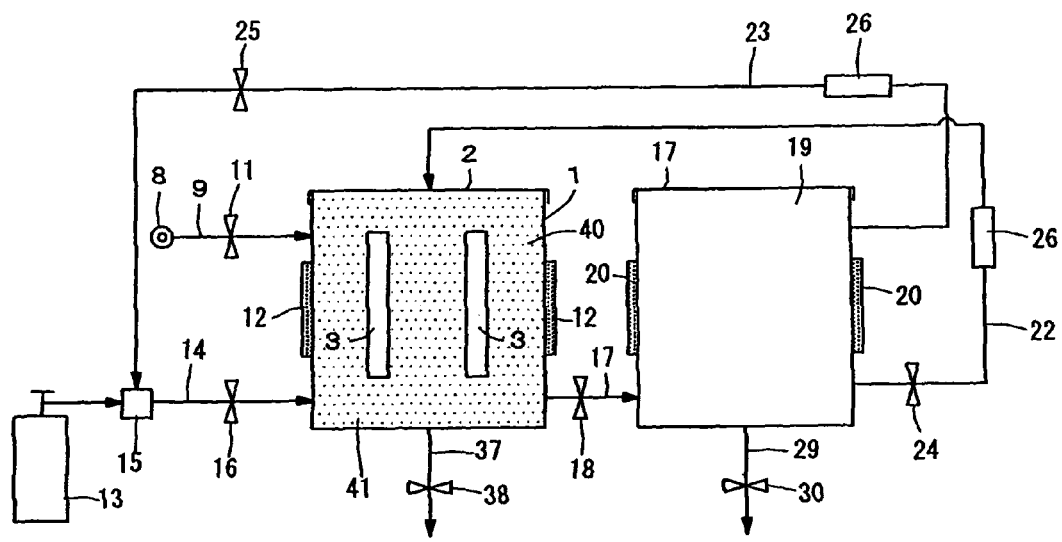
FIG. 7 is a front view showing a state in which a catalyst is being carried using the anodic oxide film forming apparatus of FIG. 5.

This condition is as shown in FIG. 7. In this embodiment, the inside of the electrolytic vessel 1 is set to 10 MPa and 80 degrees C., and under this condition, the object 3 is immersed in the highly pressurized carbonated water 41 for 12 hours, so that palladium is carried on the oxide film.

In this embodiment, since the palladium chloride is dissolved in the highly pressurized carbonated water 41 and there is no such unreasonableness as conventionally experienced that the palladium chloride is dissolved in an organic solvent such as acetone, ethanol or the like. Thus, this can be conducted easily and at a low cost, and productivity of the catalyst carrying can be enhanced.

Moreover, since there is no worry about erosion of the oxide film even if the object 3, which has been subjected to the oxide film forming treatment, is immersed in the carbonated water, the catalyst carrying can be conducted in a safe manner.

At that time, the oxide film of the object 3 is immersed in the highly pressurized carbonated water 41 for long time and a hydrate is formed. This hydrate seals the pores on the oxide film thereby effecting the sealing treatment or other similar action.

On the other hand, in this embodiment, since the catalyst carrying is conducted under high pressure, the catalyst material is permeated in the oxide film efficiently, the catalyst carrying is conducted accurately and efficiently, the catalyst carrying is improved in quality and its productivity is enhanced.

Moreover, in this embodiment, since the carbonated water is a highly pressurized carbonated water, the catalyst carrying solution can be prepared to have a predetermined acid concentration rapidly, and the environmental setting can be effected comparatively easily compared with the highly pressurized environment in which only supercritical carbon dioxide, for example, is used.

In that case, since not only ions of $Pd^{2+}$ and $CL^-$ attributable to palladium chloride, but also ions of $H^+$ and $HCO_3^-$, and $CO_3^{2-}$ attributable to carbonated water exist in the carbonated water, electrolytic carrying utilizing electrolysis can also be conducted.

After the catalyst carrying is conducted, the stop valve 18 is opened to allow the electrolytic solution in the electrolytic vessel 1 to moved into the storage tank 19, and the inside of the electrolytic vessel 1 is lowered in pressure to the normal pressure level so as to realize an empty state, so that the object 3, which has been subjected to catalyst carrying, i.e., catalyst carrying body can be recollected. This condition is as shown in FIG. 8.

The used solution, which has been moved into the storage tank 19, is lowered in pressure to the normal pressure level and returned into the catalyst carrying solution 39 and the carbonated water. The carbonated water is separated into water and carbon dioxide. Of all, the carbon dioxide is made reusable through the return pipe 23. Moreover, by opening the stop valve 30 and discharging the water into the sewage, a catalyst substance, i.e., palladium can be recollected from the catalyst carrying solution 39.

As discussed, in this embodiment, since the carbon dioxide, which has been subjected to catalyst carrying, and the expensive catalyst substance can be recollected and reutilized, this type of catalyst carrying can be conducted reasonably and efficiently, and its productivity can be enhanced.

Moreover, in this embodiment, since the oxide film forming apparatus can directly be used for catalyst carrying, the equipment cost can be reduced, and its installation space can be reduced, too, by utilizing the oxide film forming apparatus.

Thereafter, the recollected catalyst carrying body was backed for 3 hours at 300 degrees C., and a hard catalyst layer was obtained.

INDUSTRIAL APPLICABILITY

As previously described, according to an anodic oxidation method, a titanium oxide film manufacturing method and a catalyst carrying method of the present invention, the use of electrolytic solution having a strongly acid property or strongly basic property is eliminated, a carbonated water, which is inexpensive and easy to discharge, is used as the electrolytic solution, sealing treatment of the oxide film can be controlled in a simple manner, dyeing and catalyst carrying of the oxide film can be conducted reasonably and easily, catalyst carrying can be conducted safely and surely without erosion of the base material, and those methods of the present invention can suitably be applied, for example, to anodic oxidation of aluminum and titanium, and catalyst carrying on the surface of alumite.

The invention claimed is:

1. An anodic oxidation method comprising the following steps:
   dissolving supercritical carbon dioxide in water in a sufficient amount to provide a carbonated water having a pH of 3 to 4 as an electrolytic solution; subjecting an object to be treated to anodic electrolysis in the electrolytic solution, in which the object to be treated is the anode, and whereby an oxide film is formed on a surface of the object simultaneous with administering a sealing treatment;
   immersing the object to be treated in the electrolytic solution for an effective period of time after the oxide film has formed and the administering of the sealing treatment; whereby the oxide film has pores that are enlarged.

2. The anodic oxidation method of claim 1 further comprising the step of depositing a dye or catalyst species in the pores of the oxide film after enlarging the pores in the oxide film.

* * * * *